T. E. GRIFFITH.
FOLDING GATE.
APPLICATION FILED APR. 12, 1918.
1,290,176.
Patented Jan. 7, 1919.
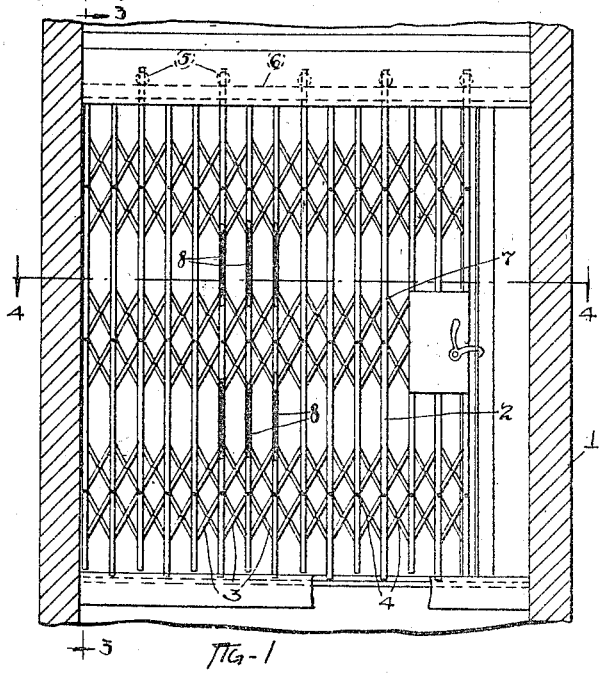
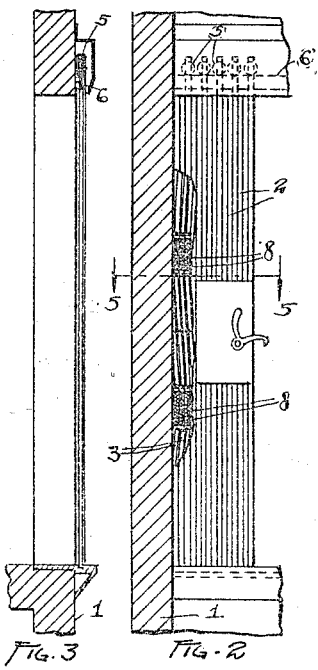
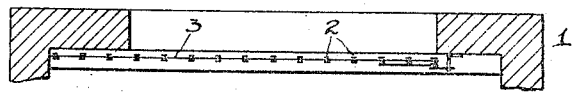
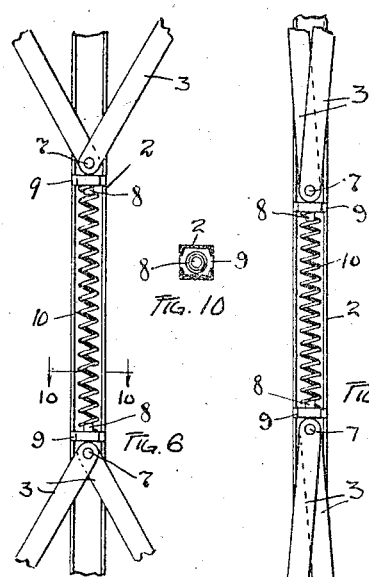
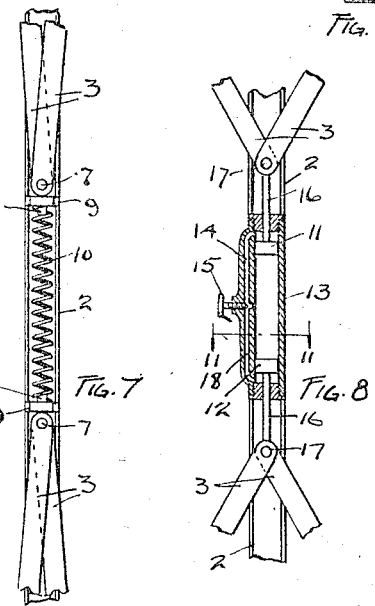
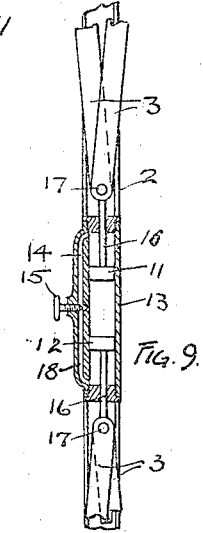
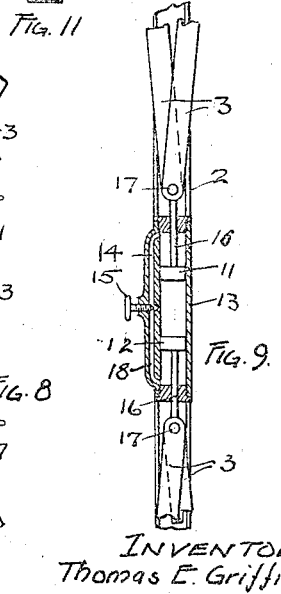
INVENTOR
Thomas E. Griffith
By Fay, Oberlin & Fay
ATTORNEYS

UNITED STATES PATENT OFFICE.

THOMAS E. GRIFFITH, OF EAST CLEVELAND, OHIO, ASSIGNOR TO THE W. S. TYLER COMPANY, OF CLEVELAND, OHIO, A CORPORATION OF OHIO.

FOLDING GATE.

1,290,176.  Specification of Letters Patent.  Patented Jan. 7, 1919.

Application filed April 12, 1918. Serial No. 228,075.

*To all whom it may concern:*

Be it known that I, THOMAS E. GRIFFITH, a citizen of the United States, and a resident of East Cleveland, county of Cuyahoga, and State of Ohio, have invented a new and useful Improvement in Folding Gates, of which the following is a specification, the principle of the invention being herein explained and the best mode in which I have contemplated applying that principle, so as to distinguish it from other inventions.

The present invention, relating, as indicated, to folding gates, is directed particularly to an improved self-closing device for use in connection with gates or doors in which the uprights are connected by the well-known lazy tongs. One primary object of the invention is the provision of a simple means for causing the gates to automatically close after being opened, although, of course, the movement given to the gates may be the reverse, i. e., the gate may be caused to open by my device should such action be necessary. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevation, partially in section, of a folding gate, embodying my invention, the gate being shown in its closed position; Fig. 2 is a similar view of the same, but showing the gate open; Fig. 3 is a section on the line 3—3, Fig. 1; Fig. 4 is a section on the line 4—4, Fig. 1; Fig. 5 is a section on the line 5—5, Fig. 2, but showing the gate in open position; Fig. 6 is an elevation showing my device in association with the lazy tongs; Fig. 7 is a similar view showing the device in a different position; Figs. 8 and 9 are views similar to Figs. 6 and 7, but showing a checking means; and Figs. 10 and 11 are transverse sections on the lines 10—10 and 11—11, respectively, in Figs. 6 and 8, respectively.

In Figs. 1, 2, 3, 4 and 5, there is shown a folding gate which may be used as an elevator door mounted in a suitable shaft or casing 1, the gate itself consisting of a framework made up of a series of parallel spaced vertical rods 2, which are connected by means of a series of lazy tongs 3. The use of lazy tongs in folding gates is of course well known and the arrangement of these devices need not be described in detail, except to say that each lazy tongs is provided and attached to the vertical rods 2 at the centers 4. Certain of the vertical rods 2 extend upwardly beyond the top of the adjacent rods and carry rollers 5 which support the gate proper and operate on suitable tracks 6, as is customary in such devices and as will be readily understood from Figs. 1 and 2.

In the elevator gate or door illustrated in these figures, there are three series of lazy tongs 3, the lazy tongs being arranged in horizontal arrangement across the gate and being parallel with each other. The gate of course moves horizontally, that is, the rods 2 are moved horizontally, and as these rods are at right angles to the central horizontal plane of each series of lazy tongs, the movement of the outer points or connections 7 of each lazy tongs is vertical in planes parallel with the position of the rods 2. These ends 7 of the lazy tongs are arranged to fall in line with and behind the rods 2, and the rods 2 are disposed in pairs, one on either side of the lazy tongs and in alinement when the gate is looked at from the viewpoint taken in Fig. 1. The rods 2 are preferably U-shaped sections, as shown in Figs. 6 and 11, in which the channels face each other and define a relatively circular inclosed area, in which area the ends or points 7 of the lazy tongs operate in a vertical direction.

Between the lower points or connected ends of the middle series of lazy tongs are disposed resilient members in the form of coiled springs 10 between the U-shaped channels 2. These springs have an outside diameter equal to or slightly less than the width of the rods 2 and are hence practically inclosed and hidden within these channels. Each spring carries a bearing member 9 in each end, having one portion 8 of reduced diameter which fits snugly into the end of the spring, while the other portion abuts against the ends 7 of the lazy tongs. A similar series of springs is disposed between the lower ends of the middle series of lazy tongs and the upper ends of the lower series.

As the gate is opened the rods 2 are moved to the left and the adjacent ends of the lazy tongs in the different series move toward each other so that the springs are compressed by this vertical movement of the ends of the lazy tongs. Any number of these springs may of course be used to give any desired resistance to the opening movement of the gate, and consequently any desired force which may be needed to close the door after the operator has let go of it.

In Figs. 8, 9 and 11 I have shown a checking means which may be used in the gate to prevent excessive rapidity of closing, although this can also be avoided by the proper design of the springs 10. This device consists of opposed pistons 11 and 12, operating in a single cylinder 13, which is suitably mounted between the channels 2 in a fixed position. This cylinder 13 is provided with bypasses 14 and 18 connecting the ends on either side of the pistons 11 and 12, and also the central portion of the same, and this channel is controlled by means of a valve 15 so that any desired resistance to movement of the pistons may be secured. In such a construction it would be desirable of course for the piston rods 16 to be connected to the studs or bolts 17 which connect the ends of the lazy tongs, as otherwise these rods 16 might be pushed to one side or the other and cause binding where they pass through the ends of the cylinder 13. A very exact regulation of the closing may be obtained by the use of one or more of the above described checking means in conjunction with the resilient closing means and proper proportioning and design will permit almost any desired timing and speed of closing. Ordinarily, however, a sufficiently close regulation may be secured by varying the strength and number of springs to the weight and movement of the gate.

The present means for automatically closing the folding gate is not only extremely simple in its construction, but it makes use of the ordinary structural units used in folding gates to practically conceal the mechanism from the user, while any desired closing action may be secured by the number of resilient elements used in the gate.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a folding gate, the combination of a series of parallel vertical pairs of channel members, members of each pair being faced toward each other to define a substantially circular area, a plurality of series of lazy tongs pivotally mounted between said channel members and having their outer adjacent ends movable within the area defined by said channel members, and resilient means mounted within said members between the adjacent ends of said lazy tongs, said means being adapted to close said gate after the same has been opened by pressure against the ends of said lazy tongs.

2. In a folding gate, the combination of a series of parallel vertical pairs of channel members, the members of each pair being faced toward each other to define a substantially circular area, a plurality of series of lazy tongs pivotally mounted between said channel members and having their outer adjacent ends movable within the area defined by said channel members, and coiled springs mounted within said channel members and between the adjacent ends of said lazy tongs, said springs being adapted to close said gate by pressure against the ends of said lazy tongs.

3. In a folding gate, the combination of a series of parallel vertical pairs of channel members, members of each pair being faced toward each other to define a substantially circular area, a plurality of series of lazy tongs pivotally mounted between said channel members and having their outer adjacent ends movable within the area defined by said channel members, resilient means mounted within said members between the adjacent ends of said lazy tongs in some of said channel members, and a checking device disposed within other of said channel members, said device being adapted to regulate the operation of said gate by said resilient means.

Signed by me, this 8 day of April, 1918.

THOMAS E. GRIFFITH.

Copies of this patent may be obtained for five cents each, by addressing the "Commissioner of Patents, Washington, D. C."